United States Patent [19]

Jancik, Jr.

[11] 4,190,278
[45] Feb. 26, 1980

[54] PANEL CARRYING DEVICE

[76] Inventor: Frank Jancik, Jr., 5510 Newton St. #6, Hyattsville, Md. 20784

[21] Appl. No.: 742,920

[22] Filed: Nov. 17, 1976

Related U.S. Application Data

[63] Continuation of Ser. No. 596,819, Jul. 17, 1975, abandoned.

[51] Int. Cl.² .............................................. B65G 7/12
[52] U.S. Cl. ................................. 294/26; 224/45 T
[58] Field of Search .............. 294/15, 17, 19 R, 26, 294/27 R, 27 H, 32, 92; 224/45 M, 45 P, 45 Q, 45 T, 45 R

[56] References Cited

U.S. PATENT DOCUMENTS

| 218,865 | 8/1879 | Eagan | 294/26 |
|---|---|---|---|
| 456,559 | 7/1891 | Francis | 294/26 |
| 1,710,575 | 4/1929 | Grant | 294/26 |
| 1,855,678 | 4/1932 | Jensen | 294/26 |
| 1,867,265 | 7/1932 | Jensen | 294/26 |
| 2,428,941 | 10/1947 | Packard | 294/26 X |
| 2,623,772 | 12/1952 | Johnson | 294/26 |
| 2,930,583 | 3/1960 | Noe et al. | 294/27 R X |
| 3,642,251 | 2/1972 | Niederhottmeyer | 294/15 X |

*Primary Examiner*—Johnny D. Cherry
*Attorney, Agent, or Firm*—R. Lewis Gable

[57] ABSTRACT

A panel carrying device for carrying wallboard panels and/or similar panel like structures where the device has a pair of panel support ends connected by curved arms to a panel engaging handle. The curved arms rock or pivot the carrying device upward when a panel is placed on the support ends for easy lifting of the panel.

5 Claims, 6 Drawing Figures

PANEL CARRYING DEVICE

This is a continuation of application Ser. No. 596,819, filed July 17, 1975, now abandoned.

BACKGROUND OF THE INVENTION

Persons carrying large panels are faced with the problems of grasping the panel, particularly when handling the panels alone. There have been panel carrying devices such as the early patent to Herbert, U.S. Pat. No. 1,428,285, and the patent to Masterson, U.S. Pat. No. 3,203,606, in the past. However, the present carrying device has novel features not shown in these or any other such devices. The Herbert carrying device is a flat sheet with a sharp bend forming a carrying support end. A handle and arm strap are connected to the flat sheet. The Herbert device requires strapping the arm strap to the workman's arm and lifting the panel by slipping the carrying support end under the panel while grasping the handle and pulling upward. The Masterson carrying device is slipped under a panel by lifting the panel by hand. This is awkward when working alone, particularly if the panel is either heavy or lengthy.

SUMMARY OF THE INVENTION

It is therefore an object of this invention to provide a novel carrying device for wallboard and the like comprised of arcuately curved arms which pivot upward when a panel is placed on the support ends of the curved arms.

Another object of this invention is to provide a novel carrying device made of sturdy metal wire or similar material having a pair of horizontal bars, either of which can be used as a carrying handle.

A further object of this invention is to provide a novel carrying device that is easy to use either alone or with someone else.

In accordance with these and other objects, there is disclosed a panel carrying device comprised of at least first and second arcuately curved members each having a panel support end integrally formed of its arcuately curved member, whereby upon placing a panel on the panel support end, the panel carrying device is rocked upwardly to permit the panel carrying device to be readily grasped.

In a further feature of this invention, first and second bars are disposed between the arcuately curved members, either of which may be used as a handle and is readily adapted to be manually grasped.

DESCRIPTION OF THE PREFERRED EMBODIMENTS

Figure 4A:
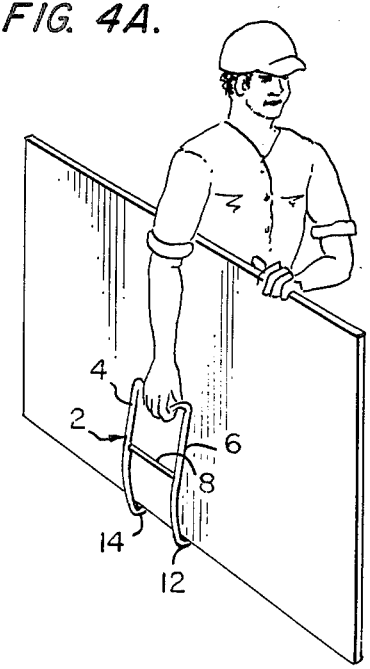
FIGS. 4A and B, and 5 are drawings illustrating the manner in which a workman may utilize the carrying device of this invention to readily carry panel-like objects.

Referring to the drawings, and in particular to FIG. 4A, the numeral "1" indicates a wallboard or similar panel which has considerable length and width, and which must be transported by workmen from place to place when erecting buildings or similar structures. Due to the length and width of the panel 1, it is quite awkward for a workman to handle, and with the carrying device of this invention, the panel 1 can be carried by the workman while the workman is standing erect, and without lifting the panel a great distance above the ground. If the panel is quite long, then two workmen, each using the carrying device 2 of this invention, may readily carry such a panel.

Figure 1:
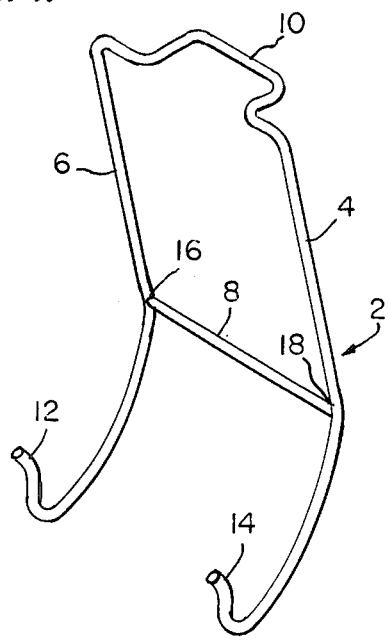
FIG. 1 is a perspective view of the carrying device of this invention.
Figure 2:
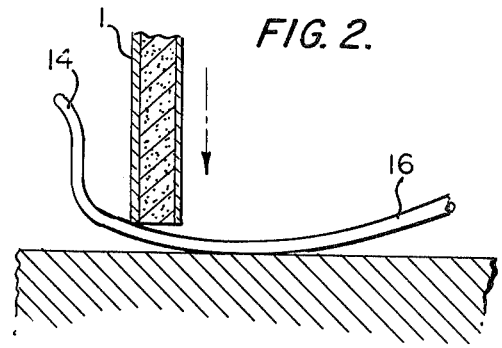
FIGS. 2 and 3 are side views of the panel carrying device as shown in FIG. 1, particularly illustrating the manner in which the panel carrying device of this invention is "rocked" by placing a panel on the support ends thereof.
Figure 3:
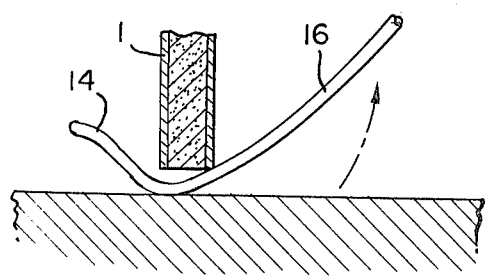

The carrying device 2 is composed of a pair of curved arms 4 and 6 connected by bars 8 and 10, with the panel supporting ends 12 and 14 at the free end of each arm. The arms 4 and 6 are arcuately curved throughout their length. There may be provided a slight break 16 and 18 or change in the curve near the lower ends of the arms, close to the support ends 12 and 14, as shown in FIGS. 1 and 3. The purpose of the arcuately curved arms 4 and 6 is to allow the panel carrying device 2 to rock and pivot upwardly, as shown in FIGS. 2 and 3, when a panel 1 is placed on it. The breaks 16 and 18 will allow the carrying device 2 to pivot further, raising the upper end higher off the ground.

Figure 5:
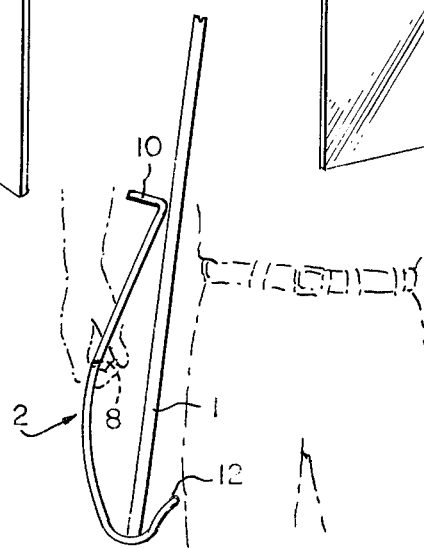

Either of the bars 8 and 10 can be used as a lifting handle. It has been found, however, that when bar 8 is used as the handle, bar 10 engages the panel 1 and gives support and balance in lifting and carrying the panel. FIG. 5 shows using the bar 8 (not shown) as the carrying handle and supporting the panel with the bar 10, while resting the upper edge of the panel 1 against the body of the workman.

In use, the carrying device 2 is placed on the floor or ground, as in FIG. 2, such that supporting ends 12 and 14 extend vertically. A panel 1 is placed on the carrying device 2 as close as possible to the ends 12 and 14. The weight of the panel forces the carrying device to pivot upward, away from the floor, as shown in FIG. 3, presenting the bar 8 or 10 for grasping as a handle.

It is possible to make the carrying device by forming a length of rod into a U-shape and arcuately bending the legs thereof of the U-shape to produce the desired arcuately curved legs 4 and 6. Thus, the bar 10 would therefore be an integral part of the formed U-shape, and the bar 8 could be welded or affixed by some other means to complete the structure once the support ends 12 and 14 have been formed. As shown in FIG. 1, the handle 10 is curved outward from the plane of the legs 4 and 6 to facilitate the workman grasping of the carrying device 2.

The carrying device can also be formed of a molded plastic and the handle can be covered in a cushioned, foam (or rubber) padding for easier gripping, without detracting from the invention.

Figure 4B:
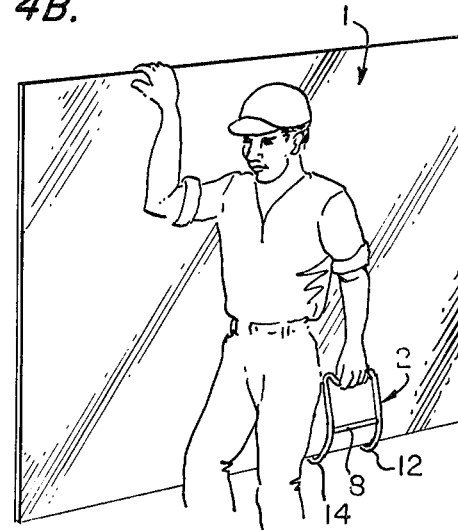

FIG. 4A illustrates the manner in which a workman may use the carrying device 2 of relatively small dimensions to carry the panel 1 inside his arm. It is understood that the carrying device 2 may also be used as shown in FIG. 4B to carry larger panels 1 on the outside of his arm.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

I claim:

1. A panel carrying device comprising a pair of support members, each having a first panel support portion and a second portion, said second portion of each of said support members including a point of connection to said first panel support portion and an end, each of said second portions of said pair of support members being curved from its point of connection to its end about a single locus disposed on one side thereof, a first bar disposed between and interconnecting said support members at substantially the respective apogees of their second curved portions, said first panel support portions disposed at an angle with respect to said second portions and extending toward said loci, whereby upon placing a panel on said first panel support portions, said panel carrying device rocks upwardly to a sufficient degree to permit said panel carrying device to be readily grasped.

2. A panel carrying device as claimed in claim 1, wherein said second portions are joined by a second bar.

3. A panel carrying device as claimed in claim 2, wherein said second bar is integral with said support members and is disposed between said ends of said second portions.

4. A panel carrying device as claimed in claim 3, wherein said first bar is a handle adapted to be manually grasped.

5. A panel carrying device as claimed in claim 1, wherein said second bar has at least a portion spaced from said support members to facilitate manual grasping thereof.

* * * * *